May 3, 1927.
A. S. JAMES
1,627,095
ATTACHMENT FOR TANK VENTS
Filed June 18, 1925
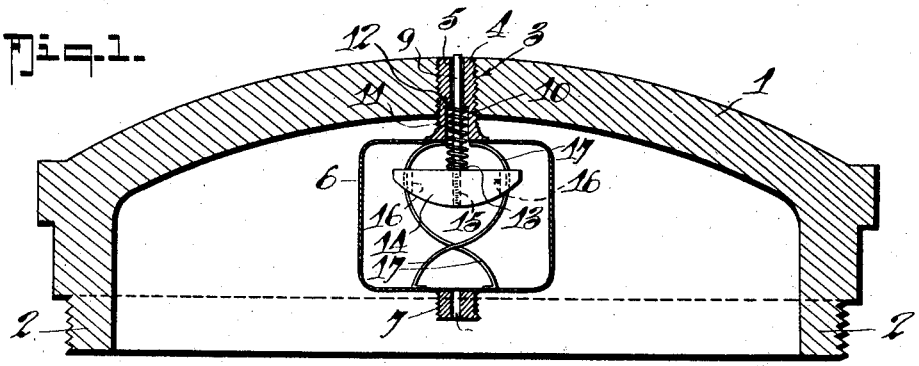
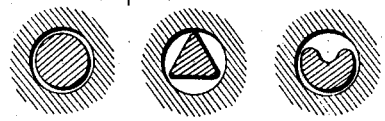
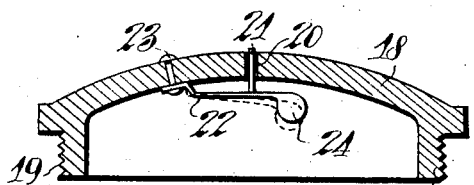
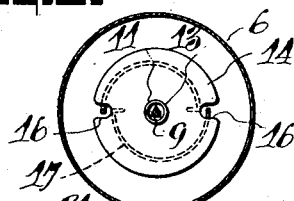
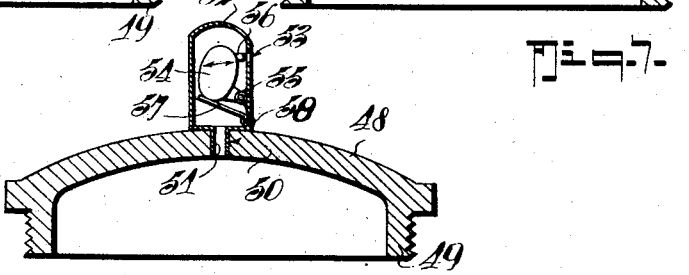
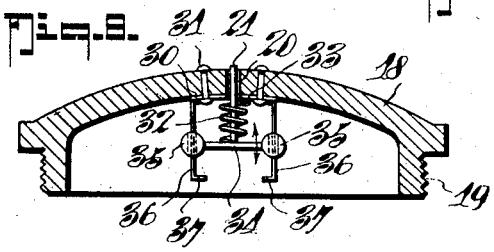
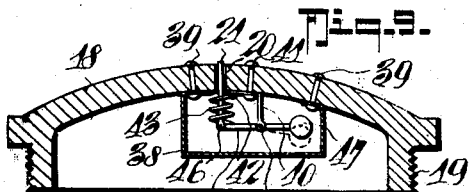
INVENTOR
Albert S. James.
BY
Albert E. Dietrich
ATTORNEY Patented May 3, 1927.

1,627,095

UNITED STATES PATENT OFFICE.

ALBERT S. JAMES, OF EUREKA, CALIFORNIA.

ATTACHMENT FOR TANK VENTS.

Application filed June 18, 1925. Serial No. 38,066.

The invention has for its object to provide a simple and effective means adapted for association with the air vent of a tank in a manner for preventing clogging of the same by dust particles or the passage of such matter into the fluid within the tank.

It is well known that the air vents of gasoline tanks and the like become clogged by dust or other solid particles and, thus occasioning a closing off of air admission into the tank, prevent proper flow of the contents from said tank. On the other hand, it is equally true that dust particles sometimes find their way through such vents into the fluid of the tank and, upon being carried by the fluid into a carbureter, occasion very troublesome failure of that delicate mechanism.

Therefore, it is the object of my invention to provide means in the nature of a vibrating plunger mountable in suitable association with the air vent of the tank, whether upon closure cap or directly upon the tank, for being so agitated by jarring or vibratory action due to movement of the automobile carrying the tank over a roadway as to cause the plunger to move in the air vent and prevent lodging of any particles therein.

The invention further resides in the provision of means for so constructing and mounting the plunger as to provide, not only for a reciprocatory vibration of the plunger in the air vent, but for a degree of rotary movement as well.

With the above and other objects in view that will hereinafter appear, the invention further resides in the novel details of construction, combination and arrangement of parts, all of which will be first fully described, then be particularly pointed out in the appended claims, reference being had to the accompanying drawing, in which:—

Figure 1 is an enlarged vertical cross section of a tank closure cap with one form of the invention mounted thereon.

Figure 2 is a horizontal section of the plunger mounting attachment shown in Figure 1 per se, the section being taken above the weight looking downward.

Figures 3, 4 and 5 are diagrammatic cross sections illustrating modified shapes of the plunger relative to the air vent.

Figures 6, 7, 8, 9 and 10 each illustrate a modification of the invention, the last stated indicating a laterally operating plunger arrangement.

While my invention is adaptable to use on any tank having an air vent and which is subjected to vibrations or jarring it will, of course, find its most common use on gasoline tanks of automobiles, and when so used is conveniently mounted on the filler cap of that tank as such caps are usually equipped with the air vent. Thus I have disclosed my invention as mounted on a tank filler cap, but its use directly upon a tank proper in proper relation with the air vent thereof is comprehended.

For purposes of illustration the form of the invention shown in Figures 1 and 2 has been illustrated as greatly enlarged. In these figures 1 indicates the filler cap which has the usual threaded flange 2 by which the same is secured upon the tank and a threaded tap 3. The tap 3 serves as a means for securing the threaded neck 4 which is air vent bored as at 5 and has secured thereto the encasing housing 6 which is of cylindrical form and has another threaded neck 7 extending from the end thereof opposite that to which the neck 4 is connected and which is also provided with an air vent bore 8. By reason of providing the pair of oppositely positioned necks 4 and 7 the casing 6 may be mounted either inside the crown of the cap 1 as indicated in Figure 1 or, by screwing the neck 7 into the tap 3, outside the crown of said cap without changing the relative position of the air vent bore 5.

A plunger pin 9 is freely slidable in the bore 5 in a manner permitting free air passage but obstructing dust particle passage into the tank. The upper end of the pin 9 preferably projects very slightly beyond the end of the bore as indicated.

The neck 4 is counterbored at 10 to accommodate the mounting of the spring 11 which coils about the pin 9 and has the upper end thereof securely connected at 12 in the upper end of the counterbore 10, and its lower end secured as at 13 to a weight 14 into which the lower end of the pin 9 is screw secured as at 15.

The spring 11 is of light tension and by thus suspending the weight 14 and securing it to the bottom of the pin 9, as the tank is jarred by movement of the automobile over the roadway the upper end of the pin will be agitated and slightly reciprocated in and through the air vent bore 5 effectively overcoming any tendency of dust and dirt to lodge therein and clog the air passage.

In addition to the above described means for reciprocably suspending the plunger pin 9, I provide means for imparting a degree of rotation to that pin to further insure against clogging of the air vent.

For this purpose the weight 14 has its peripheral edge oppositely grooved as at 16 to straddle the spirally curved wires 17 to be guided thereby so that, as the spring suspended weight 14 causes reciprocation of the pin 9 it will be spirally guided to also impart a degree of rotation to that pin.

The pin 9 may be constructed of various cross sectional shapes as illustrated in Figures 3, 4 and 5.

In Figures 6–9 the cap is indicated 18, the threaded flange 19, and the air vent 20.

In the form of the invention illustrated in Figure 6 the plunger pin 21 is carried by a thin leaf spring 22 secured at one end as at 23 to the cap 18 and having its other or free end provided with a weight 24. Obviously, as the tank is jarred the spring 22 will be caused to vibrate by the weight 24, causing the pin 21 to reciprocate in the air vent 20.

In the form of the invention illustrated in Figure 7 a plate 25 is secured as at 26 inside the crown of the cap 18 and a light tension spring 27, coiled about the pin 21 and having one end secured at 28 to the plate 25 and the other to the weight 29 carried by the lower end of that pin, serves to effect reciprocation of the pin 21 when the tank is jarred.

In Figure 8 a plate 30 is secured at 31 to the cap and a light tension coil spring 32 is secured at 33 to the plate, and at its lower end to the cross bar 34 on the ends of which are mounted weights 35 so that, as the tank is jarred the pin 21 will be vertically reciprocated. A pair of guide wires 36 may be secured to depend from the plate 30 and pass through suitable guide passages in the weights 35 to serve as guides therefor during reciprocation of the pin 21. Obviously the wires 36 may be either straight or bent according to the manner in which it is desired to guide the said pin. The wires may also be angle bent at their lower ends, as at 37, to provide stops if desired.

In the form of the invention illustrated in Figure 9 an encasing housing 38 is secured at 39 in the crown of the cap 18 and a member 40 is secured, as at 41, to the cap within that housing and serves as a means for securing, at 42, one end of the light tension coil spring 43, and as a means for pivoting, as at 44, the bar 45 to one end of which the pin 21 is pivoted at 46 and the other end of the spring 43 secured, and on the other end of which a weight 47 is mounted. As jarring of the tank is occasioned the weight 47 will cause the bar 45 to rock and the pin 21 to reciprocate in the vent 20.

In Figure 10 the tank closure cap is indicated 48 and the threaded flange thereof 49, while the air vent is indicated 50. In this form of the invention a plunger encasing housing is mounted on top of the cap by reason of having an extended neck thereof secured into the vent 50 by frictional fit or by threading as may be desired. The neck is indicated 51 and the housing 52 and the said housing is provided with a laterally directed air vent 53. A weight 54 is pivoted in the housing, as at 55, and has a plunger pin 56 projecting therefrom in a manner for registering with the vent 53 and for being passed therethrough when the weight is caused to move on its pivot 55 by vibration of the free end of the leaf spring 57 on which the weight normally rests. One end of the spring 57 is secured, as at 58, to a wall of the housing 52 and the free end of the spring is caused to vibrate as the tank is jarred.

From the foregoing description, taken in connection with the accompanying drawing, it is thought that the novel details of construction, manner of operation and advantages of my invention will be readily apparent to those familiar with the art to which it relates.

What I claim is:

1. The combination with a tank closure cap having an air vent, of a plunger, and means for mounting said plunger on said cap in a manner and in position for being susceptible to agitation in and through the air vent on movement of the tank on which the cap is being used, and means for imparting rotary motion to the plunger during agitation thereof.

2. In combination with a tank having an air vent, a plunger, and means for mounting said plunger on said tank in a manner and in position for being susceptible to agitation in and through the air vent on movement of said tank, said plunger being of a length and so mounted that in its at-rest position it will extend to the farthest end of the air vent in the direction of its projection, and means for imparting rotary motion to the plunger during agitation thereof.

3. In combination with a tank having a normally open circular air vent, a plunger, and means for mounting said plunger on said tank in a manner and in position for being susceptible to agitation in and through the air vent on movement of said tank, said plunger being non-circular in cross section.

4. In combination with a tank having a normally open circular air vent, a plunger, and means for mounting said plunger on said tank in a manner and in position for being susceptible to agitation in and through the air vent on movement of said tank, said plunger being of a length and so mounted that in its at-rest position it will extend to the farthest end of the air vent in the direction of its projection, and being non-circular in cross section.

5. In combination with a tank closure cap having a bore in the crown thereof, a housing, a neck secured to and projecting from said housing and having an air vent bore and a counterbore therein and adapted to be connected in the bore of the closure cap, a plunger pin reciprocable in the air vent bore, a weight secured to one end of the plunger pin, and a spring coiled about said plunger pin in said counterbore and having one end secured to the neck and the other end secured to said weight.

6. In combination with a tank closure cap having a bore in the crown thereof, a housing, a neck secured to and projecting from said housing and having an air vent bore and a counterbore therein and adapted to be connected in the bore of the closure cap, a plunger pin reciprocable in the air vent bore, a weight secured to one end of the plunger pin, and a spring coiled about said plunger pin in said counterbore and having one end secured to the neck and the other end secured to said weight, and means for engaging said weight to impart a degree of rotary motion thereto as the same is reciprocated.

7. In combination with a tank closure cap having a bore in the crown thereof, a housing, an upper and a lower optionally connectible neck projecting axially from the upper and lower ends of the housing and having an air vent bore and being adapted for connection in the bore of the closure cap, a plunger pin reciprocable in the air vent bore a weight secured to one end of the plunger pin, and a spring coiled about said plunger pin in said counterbore and having one end secured to the neck and the other end secured to said weight.

8. In combination with a tank closure cap having a bore in the crown thereof, a housing, a neck secured to and projecting from said housing and having an air vent bore and a counterbore therein and adapted to be connected in the bore of the closure cap, a plunger pin reciprocable in the air vent bore, a weight secured to one end of the plunger pin, and a spring associated with said plunger pin and weight whereby when the cap is jarred the plunger pin will be caused to reciprocate in the air vent bore.

ALBERT JAMES.